US008948774B2

United States Patent
Capdevielle et al.

(10) Patent No.: US 8,948,774 B2
(45) Date of Patent: Feb. 3, 2015

(54) ADAPTIVE TRAFFIC AND INTERFERENCE AWARE RADIO RESOURCE MANAGEMENT

(75) Inventors: Veronique Capdevielle, Nozay (FR); Claire-Sabine Randriamasy, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 275 days.

(21) Appl. No.: 13/496,315

(22) PCT Filed: Sep. 20, 2010

(86) PCT No.: PCT/EP2010/063801
§ 371 (c)(1),
(2), (4) Date: May 31, 2012

(87) PCT Pub. No.: WO2011/033108
PCT Pub. Date: Mar. 24, 2011

(65) Prior Publication Data
US 2012/0244873 A1    Sep. 27, 2012

(30) Foreign Application Priority Data
Sep. 18, 2009    (EP) .................................... 09290715

(51) Int. Cl.
*H04W 72/08*    (2009.01)
*H04W 28/26*    (2009.01)
*H04W 16/10*    (2009.01)

(52) U.S. Cl.
CPC .............. *H04W 28/26* (2013.01); *H04W 16/10* (2013.01)
USPC ...................... 455/452.2; 455/453; 455/452.1; 455/450; 455/451; 370/328; 370/329; 370/431

(58) Field of Classification Search
CPC ..... H04W 28/16; H04W 28/26; H04W 16/10; H04W 72/08; H04W 72/00
USPC ........... 455/450, 451, 452.1, 452.2, 453, 509; 370/328, 329, 431
See application file for complete search history.

(56) References Cited

U.S. PATENT DOCUMENTS

| | | | |
|---|---|---|---|
| 5,697,059 A * | 12/1997 | Carney | 455/509 |
| 6,223,041 B1 * | 4/2001 | Egner et al. | 455/452.2 |
| 2007/0097906 A1 | 5/2007 | Kato | |

FOREIGN PATENT DOCUMENTS

| | | |
|---|---|---|
| JP | 2007-129380 | 5/2007 |
| JP | 2009-177817 | 8/2009 |
| JP | 2009-542066 | 11/2009 |

OTHER PUBLICATIONS

Office Action of corresponding Japanese Application No. 2012-529300, dated Jul. 11, 2013, 5 pages.
International Search Report for PCT/EP2010/063801 dated Dec. 6, 2010.

* cited by examiner

*Primary Examiner* — Kashif Siddiqui
*Assistant Examiner* — Farideh Madani
(74) *Attorney, Agent, or Firm* — Fay Sharpe LLP

(57) ABSTRACT

A method for radio resources management within a set of cells ($C_1, \ldots, C_N$) covered by base stations ($BS_1, \ldots, BSN$), comprising:—retrieving traffic demands information including relative Quality of Service (QoS) and radio performance figures on each cell ($C_i$) from correspondent base station ($BS_i$);—processing the traffic demands information so as to detect at least one periodic traffic pattern;—adjusting allocated radio resources for each cell ($C_i$) according to the detected at least one periodic traffic pattern; and—reviewing the adjusted allocated radio resources according to base stations ($BS_1, \ldots BS_N$) feedbacks.

9 Claims, 2 Drawing Sheets

ADAPTIVE TRAFFIC AND INTERFERENCE AWARE RADIO RESOURCE MANAGEMENT

FIELD OF THE INVENTION

The present invention relates generally to radio resources management, and more particularly to cellular networks utilization modeling and dynamic radio resources allocation within a set of cells.

BACKGROUND OF THE INVENTION

The daily increasing number of mobile subscribers, the ever evolving nature of mobile services and the widespread use of mobile terminals imply regular adjustment of wireless networks, otherwise call dropping, call rejection and low communication qualities will be observed. Thus, for cellular network operators, whose main concern is to satisfy their subscribers' expectations, network maintenance is one of the most important issues.

A first network maintenance solution consists of regular improvement of radio planning, such as by adding/moving base stations, or by modifying transceivers. However, this approach is costly and complex as the least alteration in the network area (i.e., the appearance of new stations or shops) requires a new planning activity. Furthermore, under this solution, operators are unable to accommodate a sudden and transient increase in traffic (i.e., a demonstration or cultural events).

A second network maintenance approach consists of Radio Resources Management (RMM). In fact, RRM is the most commonly used mechanism to amend wireless networks performance. A network operator has to monitor the system performance constantly on the basis of radio resources allocation among cells. Advantageously, RRM supports a large number of mechanisms (such as frequency allocation procedures integrated in the Universal Mobile Telecommunications System (UMTS)), increasing the flexibility and easiness of the network configuration.

Hence, RRM is considered as a key functionality in wireless networks to manage and control co-channel interference, while guaranteeing a target grade of services. Thus, wireless network operators usually estimate future needs and, accordingly, reallocate radio resources among cells by adding more resources where needed.

In particular, RRM finds importance in traffic overload scenarios wherein needed resources must be accurately estimated to be allocated where needed. Otherwise, the inability of operators to meet their subscribers' expectation is usually severely criticized.

RRM is usually based on rough estimates which will be manually performed, leading to a sub-optimal radio resources allocation and even, in some cases, an unintentional worsening of the performance of the system by creating for example co-channel interference.

SUMMARY

Often traffic overload scenarios depend on a plurality of parameters which are not usually available and not easily predictable without a specific traffic monitoring device. As examples of such parameters, one can mention:
- the starting time, such as the starting time of busy hours. Busy hours means, in RRM context, the period during which the maximum total traffic load in a given 24-hour period occurs;
- the location, such as the holidays resorts wherein a considerable number of people spend their holidays (e.g., islands, seaside, and mountains) or an accident location (e.g. road accidents);
- the duration, such as during public holidays (e.g., New Year's Day or Christmas) during which people enjoy contacting relatives and friends, thereby causing a huge growth of the traffic demands during a period of time;
- the concerned cells, such as in a demonstration event where the congestion may appear at the surrounding cells, as the crowd arrives at, or leaves, the demonstration location, as well as the advancement of the demonstration path;
- the traffic overload amount, such as during cultural or sporting events wherein a large number or, eventually, a few number of persons may be concentrated in a limited location;
- the concerned channels of the communication standard, such as in the case of accidents (i.e. road accident) or a catastrophe (earthquake or floods) due to emergency calls;
- the required types of communications and their respective quality of service constraints (i.e., voice call, Short Message Service (SMS), Wireless Access Protocol (WAP), General Packet Radio Service (GPRS) or video streaming);
- the currently used radio performance figures, such as used frequency band, or modulation and coding scheme;
- the currently experienced quality of service, such as the experienced Signal-to-interference-and-Noise ratio (SINR), the call blocking statistics or the co-channel interference level between adjacent cells.

In some scenarios, some parameters may be known in advance, such as New Year's Day, or roughly estimated such as sport event duration. However, other parameters such as the variation of time windows of traffic overload scenario in function of time or location (such as metropolitan, urban, residential zone, business zone) cannot be easily predictable.

Moreover, some parameters may, to some extent, be estimated in a certain scenario (such as concerned cells by traffic overload in a cultural event: theatre, movies, concerts), and not predictable in other scenarios (such as in the case of a catastrophe, an unexpected network shortcoming or an accident).

Hence, traffic overload scenarios are often not fully described, for example in time (for example, starting time, duration, variation over time), in frequency need (required frequency bands, multiplexing technique and so on), location (concerned cell or areas) or a combination thereof. In particular, up-to-date RRM schemes are not simultaneously integrated with interference status and with traffic demand information and different time scales.

Since RRM is usually based on rough estimates which will be manually performed, this may lead to a sub-optimal radio resources allocation and even, in some cases, an unintentional worsening of the performance of the system by creating for example co-channel interference.

The present application presents embodiments of a method for radio resources management within a set of cells covered by base stations.

One embodiment comprises the following steps:
- retrieving traffic demands information including relative Quality of Service (QoS) and radio performance figures on each cell from correspondent base station;
- processing the traffic demands information so as to detect periodic traffic patterns;

adjusting allocated radio resources for each cell according to at least one detected periodic traffic pattern; and reviewing the adjusted allocated radio resources according to base stations feedbacks.

The present application also presents embodiments of cells controller for radio resources management within a set of cells covered by base stations.

One embodiment comprises:

means for retrieving, for example during a learning phase, information on traffic demands with relative QoS and radio performance figures on a plurality of cell from correspondent base station;

means for processing the information on traffic demands so as to detect periodic traffic patterns;

means for adjusting allocated radio resources for the plurality of cell according to the detected periodic traffic patterns; and means for collecting feedbacks from base stations concerning the adjusted allocated radio resources scheme.

In one embodiment, a traffic and interference aware multiple access scheme within a set of cells is provided.

In another embodiment, traffic overload situations detection is enabled, overload situations are anticipated and, accordingly, network parameters are spontaneously reconfigured as needed.

In one embodiment, the performance of wireless networks is enhanced by avoiding co-channel interference and maintaining a target quality of service.

In one embodiment, an adaptive radio resources allocation scheme, under the limitation constraint of radio resources, is provided.

In one embodiment, a self-trained intelligent radio resources allocation scheme is provided.

In one embodiment, radio resources utilization over time within each cell of a controlled set of cells is predicted.

In one embodiment, radio resources of a plurality of cells are jointly managed.

In one embodiment, radio resources among a set of cells are optimally allocated so as to match all requested services within each cell.

In one embodiment, an adaptive and dynamic resources management method among a set of cells is assured.

In one embodiment, an updated global view on the utilization of radio resources within a plurality of cells is kept.

In one embodiment, a statistical approach for radio resources management is provided.

In one embodiment, a traffic and interference aware resource management system is provided.

In one embodiment, a self-regulation and intelligent decision making concerning radio resources reconfiguration within a set of cells is provided.

In one embodiment, a right insight into the radio resource utilization within a set of cells is acquired.

In one embodiment, insufficient resources provisioning situations, resulting in QoS degradation, are anticipated by adopting time/frequency resources shared between cells according to the actual needs of each cell.

In one embodiment, a real-time monitoring approach that observes a set of parameters and enables intelligent decision-making with respect to the network current performances is provided.

BRIEF DESCRIPTION OF THE DRAWINGS

The above and other objects and advantages of the invention will become apparent from the detailed description of preferred embodiments, considered in conjunction with the accompanying drawing, in which.

DESCRIPTION OF PREFERRED EMBODIMENTS

Figure 1:
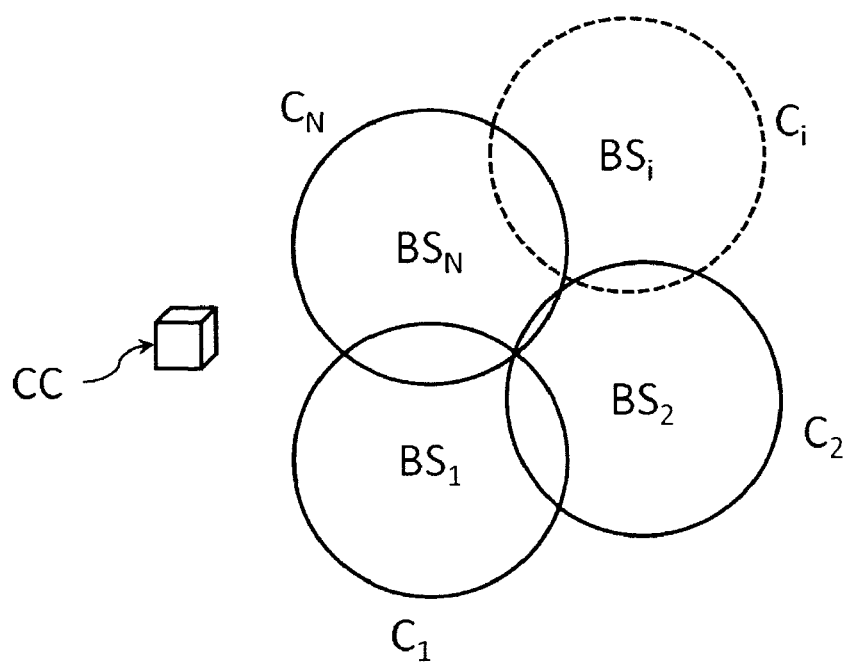
FIG. 1 is a schematic diagram illustrating a plurality of cells from a cellular network concerned with radio resources management.

As illustrative example, and with reference to FIG. 1, a set of interfering cells $C_1, \ldots, C_N$, respectively, are covered by base stations $BS_1, \ldots, BS_N$ that share common time and frequency resources. The radio resources usage of these base stations $BS_1, \ldots, BS_N$ is managed and controlled by a cells controller CC. As an exemplification,:

$BS_1, \ldots, BS_i$ (wherein i is an integer equal or greater than 1) cover a residential zone wherein activity is high in the evening (for example, workers come back to home) and lower during day; whereas $BS_{i+1}, \ldots, BS_N$ (wherein i is less than N) cover a business area wherein traffic activity is dominant during work day.

Rather than considering equal sharing of radio resources among Base stations $BS_1, \ldots, BS_N$, associated to a downlink sub-frame, a variable RRM in function of traffic demands and relative QoS in each cell $C_i$ is adopted. Otherwise, high traffic demands in late hours for "residential" $BS_1, \ldots, BS_i$ or during business hours for "business" $BS_{i+1}, \ldots, BS_N$ may not be satisfied due to insufficient allocated resources, leading to high call drops, performance degradation and call rejections.

To that end, the CC may monitor two phases:

an automatic learning phase permitting to analyze the radio cells performance and radio resources utilization so as to generate an optimum multiple access scheme;

an operating phase responsible for performing the optimum traffic and interference aware multiple access scheme, given by the previous phase.

The cells controller (CC) collects on a given time period basis (for example per hour, per day, per week, per month, or per year):

information on traffic demands, on each cell $C_i$, such as service type (for example, voice call, SMS, WAP, GPRS or video streaming), number of calls, call duration or call inter-arrival time;

information on each radio cell $C_i$ performance figures, such as experienced Signal-to-interference-and-Noise ratio (SINR), frequency band, radio communication standard, mono/multi-antennas technology, coding scheme, modulation scheme in both communication directions, number of collisions, number of call rejection, Bit Error Rate (BER).

These observed information on traffic demand and on performance figures on each cell $C_i$, which may be retrieved from base stations $B_1, \ldots, B_N$, are the subject of a statistical mining so as to identify Periodic Traffic Patterns (PTP) within the collected traffic activity. In fact, daily statistics exhibit some periodicity of the traffic activity over cells (for example, free/busy hours present similar characteristics from one day to another). Traffic patterns during these periods are called Periodic Traffic Patterns PTP; and subsequently to distinguish Stable Traffic Periodic Slots (STPS) within each PTP. Thus, each PTP is subdivided into STPS during which variations on the traffic activity is limited in comparison with a threshold. The threshold may be predetermined by the cells controller or provided by a network operator through an programmable interface It is to be noted that the expression "pattern" is intended to mean here a shape within a certain parameter distribution in function of at least another parameter, such as the variation of calls number in function of time within a cell, the established communication type (for example, voice call, SMS, WAP, GPRS, Video streaming, file transfer) in function of time within a cell, used time/frequency resources in function of cells and the like.

A pattern has its occurrence value (for example, the occurrence time or the occurrence location) and its spread around this value. Periodic Traffic Patterns may be identified by using local/global maximum and minimum searching techniques or automatic clustering techniques.

Collected information on traffic demand and on performance figures of each cell $C_i$ undergo a multi-dimensional statistical analysis, as these information are jointly studied in a plurality of domains. As examples, one can mention radio resources use per spatial area, radio resources use over time, service types (for examples, voice call, SMS, WAP, GPRS, Video streaming, file transfer) per spatial area; frequency resources use over time per spatial area, number of calls per spatial area, channel (for example Broadcast Channel (BCH), Standalone Dedicated Control Channel (SDCCH), Common Control Channel (CCCH), or Random Access Channel (RACH)) use in function of time per spatial area and the like.

A plurality of statistical study on observed information on cells $C_1 \ldots, C_N$ may be performed, such as the variation of the cumulative density function or the distribution function of number of calls over time per spatial area, or the mean/variance of BER per service over time and per spatial area. Such statistical mining may be performed by using any technical/numerical computing environment.

A plurality of models may be obtained through statistical analysis of observed information and which faithfully describe radio resources utilization on each cell $C_i$, or on the whole set of cells. As non-limitative examples of such patterns, one can mention:

a call pattern that describes the calling behavior of mobile users with a set of descriptive parameters and their distributions within each cell. Such parameters may comprise call duration, call inter-arrival time or service type (such as voice call, SMS, WAP or GPRS);

a mobility pattern that describes the effects of subscribers movements on traffic and signaling channels (location update and handover);

a population size pattern that describes the variation, over time, of the number of subscribers to be served within a given cell $C_i$;

a call blocking pattern that describes rejected call in function of the total incoming call per cell $C_i$;

a BER pattern that quantifies co-channel interference between adjacent cells and, hence, quality of service degradation and the like.

Traffic patterns emphasize, on a daily, on a weekly, or on a monthly basis, the behavior of network resources utilization and radio cells performances.

These patterns permit, for examples, to determine, with a good confidence degree, the time occurrence of busy hours, as well as their locations, and their respective traffic overloads. Consequently, even if the resources utilization in a given cell $C_i$ varies over time in a priori unpredictable way, the traffic overload can be estimated fairly correctly from established models.

STPS are deduced from PTP by identifying more or less constant part within these PTP. As illustrative example, one may distinguish an STPS on cells $B_{i+1}, \ldots, B_N$ around the 12-to-14 P.M. time window. For example, this STPS may show a daily (except during holidays) important and averagely constant number of established calls.

Moreover, cells controller CC may derive statistics on
traffic demands: distributions on applications types and volumes observed per time slot or greater period (example: a % of the cell traffic is best effort-like with target average data rate with given peak rates, b % is the Voice traffic with data rate to guarantee, the remaining traffic would be delay sensitive traffic such as video streaming); and radio cell performance, for example, cumulative density function of modulation and coding schemes is a possible radio performance metric: y1% of the communication in the cell are performed with QPSk ½, y2% in 16 QAM ½, ..., the remaining in 64 QAM ¾.

Traffic and Interference Aware Multiple Access Resource Allocation (TIAMA_RA) utilizes STPSs and radio cells performances in order to predict resources that would be needed per cell $C_i$ and per STPS. Then, a Traffic and Interference Aware (TIAMA) process is performed for each STPS.

Traffic demands with given QoS constraints (such as best effort-like or voice with guaranteed bit rate or delay sensitive traffic such as video streaming) as well as radio performances figures (such as modulation and coding rates with link adaptation application, SINR, or BER) may be taken into account during radio resources allocation.

Following the statistical analysis performed on observed information, a plurality of traffic demands scenarios may be identified according to some statistical parameter, such as busy hours occurring in a given location with a certain periodicity in time;

a sport event occurring in a given location wherein radio resources utilization exhibits "dead" periods (first and second part of a match) and an extremely active period (half time of a match, gaining a victory or scoring of a goal);

New Year's Day with a traffic overload around midnight;

a road accident with an important use of RACH, TCH and SDCCH channels; and an inter-cell interference with a high BER.

In the case of exceptional events occurring over some of the cells' coverage CC managed area, the Traffic and Interference Aware Multiple Access Resource Allocation (TIAMA_RA) scheme may be estimated on the basis of information that has been previously collected during similar events.

Identified traffic patterns on collected information permit the anticipation of insufficient radio resources, and thus the adapting of time/frequency resources shared between cells to the actual needs of each cell.

At starting time of each computed STPS, the cells controller CC notifies the cells of the resources blocks that are assigned thereto according to TIAMA scheme. Feedback from each cell $C_i$ on its communications performance resulting from TIAMA application towards the cells controller CC either validates the multiple access schemes or triggers another TIAMA computation phase.

Figure 2:
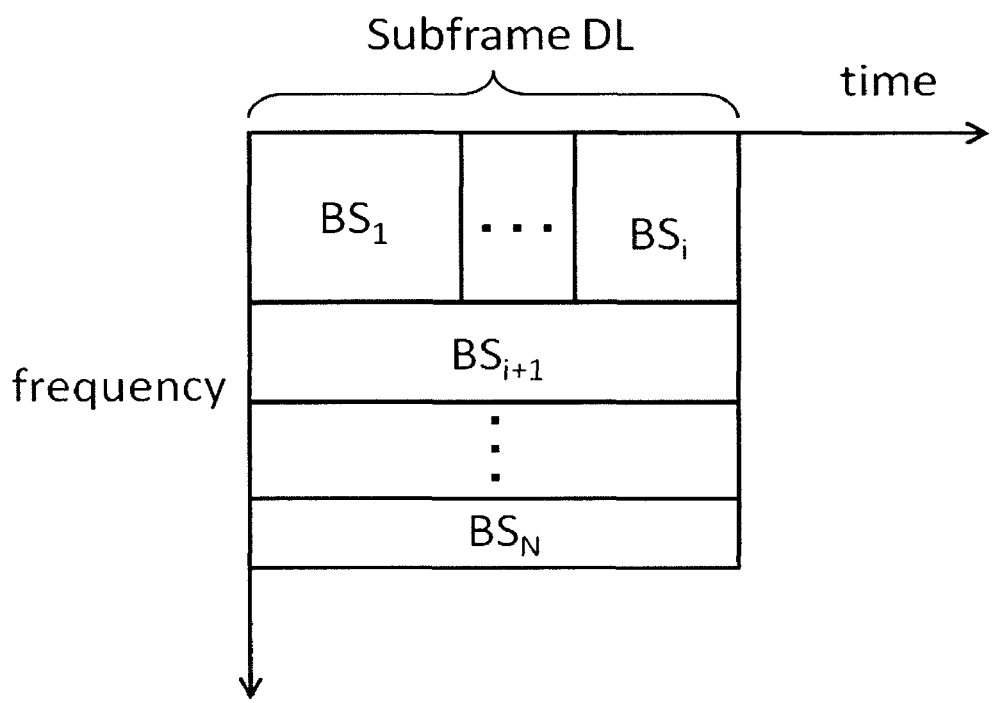
FIG. 2 is a schematic diagram illustrating a radio resource allocation.

FIG. 2, illustrate frequency slot repartition over time among cells $C_1, \ldots, C_N$. This example of frequency slot allocation scheme is based on identified STPS around the time window 12-to-14 P.M in "residential" $BS_1, \ldots, BS_i$ and "business" $BS_{i+1}, \ldots, BS_N$ as discussed in the example above. FIG. 2 shows time/frequency resource block that are unequally allocated to $BS_1, \ldots, BS_i$ and $BS_{i+1}, \ldots, BS_N$ during the STPS time window and in a subframe in downlink (subframe DL).

Cells controller CC reviews radio resources allocation scheme according to base stations $B_1, \ldots, B_N$ feedbacks. The allocation radio resources scheme may be reviewed as soon as there is a negative feedback (for example a quality of service violation, a co-channel interference or an increase in call blocking).

Figure 3:
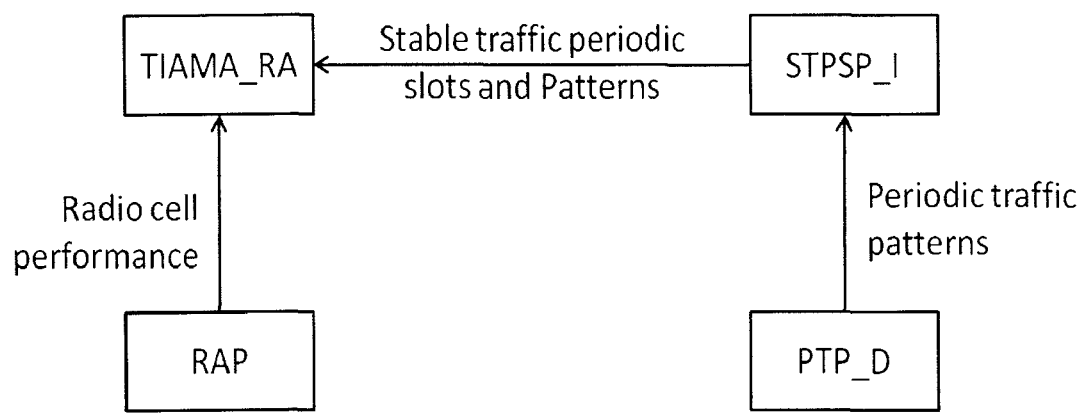
FIG. 3 is a schematic diagram illustrating an exemplary embodiment, permitting an adaptive traffic an interference radio resource management.

Various embodiments of methods described herein may be performed within a set of base stations $BS_1, \ldots, BS_N$ by a TIAMA system implemented within the Cells controller CC, illustrated in FIG. 3. The exemplary system includes:

Periodic Traffic Patterns Detection (PTP_D) means which detects periods in a given duration of time during which traffic activity over the cells is recurrent from one period to another;

Stable Traffic Periodic Slots and Patterns Identification (STPSP_I) means which identify subdivisions (no lower than the period time scale) of PTP: Stable Traffic periodic Slots (STPS) during which variations on traffic activity is limited. Then, the associated traffic pattern per cell, that is uniform on the STPS, is computed;

Radio cells Performances (RAP) means which collects radio performance (e.g., spectral efficiency) reported by each cell;

TIAMA Resource Allocation (TIAMA-RA) means which compute the resources that are allocated to each cell per allocation interval. The allocated resource account for data related to traffic demands (the stable traffic patterns processed per SIPS) and to the experienced radio cells' performance.

The cells controller may further comprise:

means for transmitting, via command signals, allocated radio resources to each cell $C_i$; and means for applying allocated resources so as to make operative the allocated radio resources scheme.

With reference to FIG. 3., in one embodiment, the cells controller includes means for retrieving information on traffic demands (RAP); means for processing the information on traffic demands so as to detect periodic traffic patterns (PTP_D) and means for adjusting allocated radio resources according to the detected periodic traffic patterns (TIAMA_RA) and means for collecting feedbacks from the correspondent base stations ($BS_1, \ldots, BS_N$) concerning the adjusted allocated radio resources (RAP).

Allocated resources have to fit cells' needs. In fact, Cells controller CC determines an appropriate scaling effect to be performed on finite radio resources and which will be allocated to cells $C_1, \ldots, C_N$, while maintaining a satisfactory quality of service within each cell $C_1, \ldots, C_N$. In other words, Cells controller CC determines expected radio resources in corresponding times and locations within the finite radio resources constraint. Accordingly, in the example of FIG. 1, much more resources are allocated to $BS_{i+1}, \ldots, BS_N$ during business hours which are estimated by collected information mining. During these hours, $BS_1, \ldots, BS_i$, having less expected demands are allocated less resources to the profit of competing business area cells that have more expected demands.

It is to be noted that TIAMA functionalities may be activated on demand upon experienced degradation of QoS in some cells, for example.

It is also to be noted that TIAMA functionalities and modules may be implemented in a distributed or centralized manner.

TIAMA_RA suitably accommodates subscribers' need, based on previous traffic demands and experienced radio performance and the current difference between competing cells which are under the control of the cells controller CC.

Advantageously, TIAMA outputs valuable information on mobile user behaviors (such as application usage or mobility) which permits the anticipation of resource allocation updates and network maintenance.

It is to be noted that TIAMA_RA is independent of the deployed communications standard (such as GSM, UMTS, CDMA or LTE) within cells $C_1, \ldots, C_N$.

All of the functions described above with respect to exemplary methods are readily carried out by special or general purpose digital information processing devices acting under appropriate instructions embodied, e.g., in software, firmware, or hardware programming. For example, functional modules may be implemented as an ASIC (Application Specific Integrated Circuit) constructed with semiconductor technology and may also be implemented with FPGA (Field Programmable Gate Arrays) or any other hardware blocks. Further, the described means may be implemented by a processors programmed with the appropriate instructions and provided with access to appropriate memory.

The invention claimed is:

1. A method for radio resources management within a set of cells ($C_1, \ldots, C_N$) covered by base stations ($BS_1, \ldots, BS_N$), the method comprising:

retrieving traffic demands information including Quality of Service (QoS) and radio performance figures on each cell (Ci) of said set from correspondent base stations (BSi);

processing the traffic demands information so as to detect at least one periodic traffic pattern by identifying a stable traffic periodic slot within the detected in at least one periodic traffic pattern, wherein the stable traffic periodic slot is a time period during which variation in the traffic activity is below a predetermined threshold;

for each identified stable periodic slot, adjusting allocated radio resources for one or more cells of said set (Ci) according to the detected at least one periodic traffic pattern; and reviewing the adjusted allocated radio resources according to feedbacks from the base stations ($BS_1, \ldots, BS_N$).

2. The method of claim 1, wherein retrieving traffic demands information occurs during a learning phase encompassing a time period.

3. The method of claim 1, wherein processing the traffic demands information comprises performing multi-dimensional statistical analysis of the traffic demands information on each cell (Ci) of said set of cells ($C_1, \ldots, C_N$).

4. The method of claim 1, wherein adjusting allocated radio resources minimizes co-channel interference and maintains a target quality of service.

5. A cells controller for radio resources management within a set of cells ($C_1, \ldots, C_N$) covered by base stations ($BS_1, \ldots, BS_N$), the cells controller comprising:

a processor configured to:

retrieve information on traffic demands including Quality of Service (QoS) and radio performance figures on each cell (Ci) of said set from correspondent base station (BSi);

analyze the information on traffic demands so as to detect periodic traffic patterns by identifying a stable traffic periodic slot within a detected periodic traffic pattern, wherein the stable traffic periodic slot is a time period during which variation in the traffic activity is below a predetermined threshold;

for each identified stable traffic periodic slot, adjust allocated radio resources for one or more cells of said set (Ci) according to the detected periodic traffic patterns;

collect feedbacks from the correspondent base stations ($BSi, \ldots, BS_N$) concerning the adjusted allocated radio resources.

6. The cells controller of claim 5, wherein the processor is configured to collect information on traffic demand and radio performances figures on each cell (Ci) per time span.

7. The cells controller of claim 5, wherein the processor is configured to compute and schedule radio resources to be allocated to each cell (Ci) of said set, and to determine and transmit a command signal to the one or more cells of said set (Ci), the command signal including at least one radio resources parameter dedicated to the correspondent cell (Ci).

8. The cells controller of claim 5, wherein the processor is adapted to adjust allocated radio resources based on the feedbacks.

9. A computer program embodied on a non-transitory memory of a computer and/or a dedicated system for radio resources management, wherein said computer program comprises instructions causing a processor to perform a method for radio resources management within a set of cells ($C_1, \ldots, C_N$) covered b base stations ($BS_1, \ldots, BS_N$), the method comprising:

retrieving traffic demands information including Quality of Service (QoS) and radio performance figures on each cell (Ci) of said set from correspondent base stations (BSi);

processing the traffic demands information so as to detect at least one periodic traffic pattern by identifying a stable traffic periodic slot within the detected in at least one periodic traffic pattern, wherein the stable traffic periodic slot is a time period during which variation in the traffic activity is below a predetermined threshold;

for each identified stable periodic slot, adjusting allocated radio resources for one or more cells of said set (Ci) according to the detected at least one periodic traffic pattern; and reviewing the adjusted allocated radio resources according to feedbacks from the base stations ($BS_1, \ldots, BS_N$).

* * * * *